US006125310A

United States Patent [19]
Holmes

[11] Patent Number: 6,125,310
[45] Date of Patent: Sep. 26, 2000

[54] THRUSTER ON TIME SIGNALING WITH FLEXURE COMPENSATION AVOIDANCE

[75] Inventor: Thomas J. Holmes, Portola Valley, Calif.

[73] Assignee: Space Systems/Loral, Inc., Palo Alto, Calif.

[21] Appl. No.: 08/896,967

[22] Filed: Jul. 18, 1997

[51] Int. Cl.$^7$ ............................... B64G 1/24; G05D 3/20
[52] U.S. Cl. .......................................................... 701/4
[58] Field of Search .................................. 701/4, 13, 226; 244/164, 165, 169, 171, 172

[56] References Cited

U.S. PATENT DOCUMENTS

| | | |
|---|---|---|
| 3,866,025 | 2/1975 | Cavanagh .............................. 235/150.2 |
| 4,537,375 | 8/1985 | Chan ........................................ 244/171 |
| 4,567,564 | 1/1986 | Bittner et al. ............................... 701/4 |
| 4,599,697 | 7/1986 | Chan et al. ............................... 364/434 |
| 4,758,957 | 7/1988 | Hubert et al. ........................... 364/434 |
| 4,961,551 | 10/1990 | Rosen ..................................... 244/164 |
| 5,257,802 | 11/1993 | Hablani ................................... 244/164 |
| 5,562,266 | 10/1996 | Achkar et al. .......................... 244/171 |

*Primary Examiner*—William A. Cuchlinski, Jr.
*Assistant Examiner*—Edward Pipala
*Attorney, Agent, or Firm*—Perman & Green, LLP

[57] ABSTRACT

A system and process is described for maintaining the attitude of a space craft to compensate for external disturbances. The on board computer generates a thruster on time signal derived from a comparison of estimated adjusted attitude based substantially on rigid body assumptions which to do not take into consideration the flexing reactions of on board flexible components.

6 Claims, 2 Drawing Sheets

1

THRUSTER ON TIME SIGNALING WITH FLEXURE COMPENSATION AVOIDANCE

BACKGROUND OF THE INVENTION

The invention described below relates to the control of satellites. Such satellites must be maintained in a predetermined orbit and attitude in order to accomplish the assigned mission which can be surveillance, photography, detection and many others. The orbit and attitude of the satellite must be periodically adjusted to compensate for disturbances which occur in space or for the purpose of changing the mission. Such adjustments are obtained by the firing of thrusters mounted on the satellite to create forces in the proper axis to attain the desired maneuver. In prior art systems, an onboard computer analyzes data relating to the actual attitude obtained from onboard sensors and compares such data to the desired attitude which may be periodically updated by a ground station mission controls operator. The onboard computer generates on time signals, energizing the thrusters to compensate for errors in attitude.

This control process is rendered significantly more complex because of inherent inconsistencies in the thruster firings. In addition, the forces exerted on the satellite during the thruster firing create additional attitude disturbances which are aggravated by flexible components on the satellite such as antennae. These disturbances are reflected in the signals from on board sensors. All of these factors create errors in spacecraft attitude that must be managed.

Many satellites are equipped with apparatus which extends outward from the main body of the spacecraft. Antennae and solar arrays are generally flexible and deform under the forces of attitude adjustment. This creates reactionary forces which will alter the attitude of the satellite.

In prior art systems, the onboard computer senses these attitude changes through the attitude control sensors and, utilizing complex algorithms, generates attitude adjustment thruster firing signals which compensate for the flexing of the extended elements. The use of onboard attitude sensors in this manner makes the control system sensitive to the parameters of the flexible apparatus. Due to the continuous torque disturbances placed on a satellite from orbital maneuvers, prior art systems require operator intervention, prior to a maneuver, to program the control system with the expected torque to which the spacecraft will be subjected. Also, because prior art systems use only onboard sensors to provide attitude information about the spacecraft, a Pulse Width Phased Frequency (PWPF) triggering device needs to be used to pulse the thrusters on and off appropriately. Without this device, the thruster would remain on too long while the controller waits for the attitude sensor to adjust to the new attitude.

The reliance on sensor data for attitude information will necessarily result in the inclusion of the effects of vibration of the flexible components which cause the control to oscillate. The oscillations required complex algorithms to reject the effects of the oscillatory components and provide appropriate control signals.

It is the purpose of this invention to construct an attitude control system which has reduced sensitivity to the characteristics of the flexing apparatus thereby eliminating the need for flexible mode compensation used in the prior art. It also removes the need for operator intervention and eliminates the need for a PWPF.

In the system of this invention, the control system uses attitude shift assumptions to estimate the resultant attitude of a thruster firing. Data, generated by the onboard sensors, is used to correct attitude estimation errors resulting from the assumptions. In this manner, the effect of the oscillating torque created by the flexible accessories on the space craft are minimized.

SUMMARY OF THE INVENTION

A control system and process is described for maintaining the attitude of a space craft in response to external disturbances. As part of the control system of this invention, an observer module is provided which is programmed to estimate the resultant attitude of a thruster firing based solely on rigid body assumptions. This estimate is compared to a predetermined mission attitude to obtain an error signal and the thruster on times are set by this difference to achieve the required attitude adjustment. Onboard attitude control sensors provide data relating to the actual attitude of the satellite. The attitude data signals are used to improve the estimate of the resultant attitude of the thruster firings. This method avoids the need for the flexible mode compensations used by prior art systems.

DESCRIPTION OF THE DRAWING

The subject invention is described in more detail below with reference to the drawing in which.

DETAILED DESCRIPTION OF THE INVENTION

Figure 1:
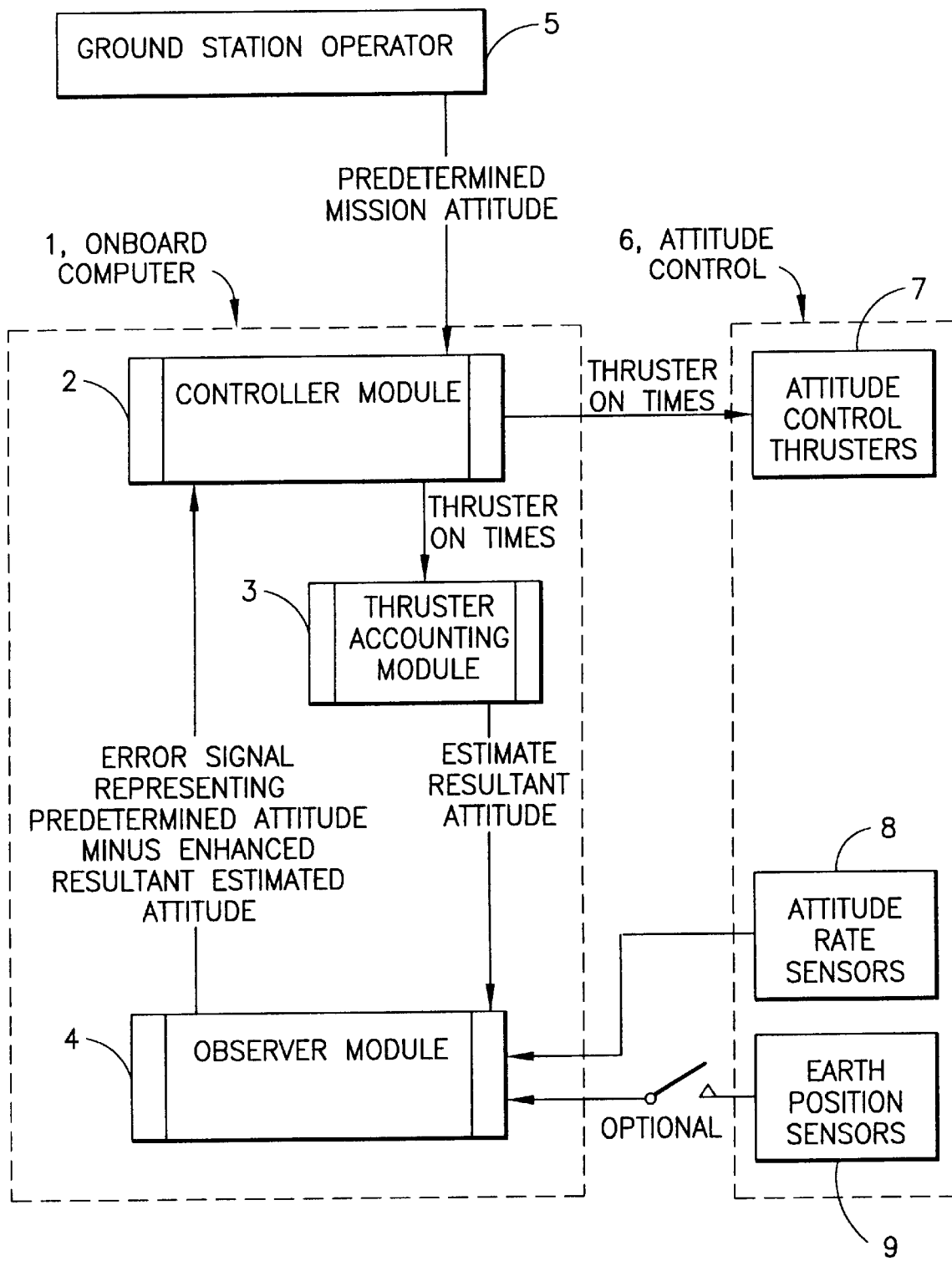
FIG. 1 is a block diagram of the system of this invention.

The attitude control system 6 of this invention consists of a conventional three axis thruster configuration 7 for creating torque to adjust the attitude of a satellite. In conjunction with the thrusters, gyroscopic sensors (attitude rate sensors 8) are used to continuously provide data indicative of the actual thruster disturbances to the attitude rates of the satellite. After the satellite is placed in orbit, this control system 6 is used to maintain the predetermined attitude, which was previously set by the ground station computer 5 to meet the requirements of a particular mission.

Due to a variety of influences present in space, the orbit of the satellite must be adjusted as the satellite shifts beyond its allocated orbital slot. A single or a set of thrusters 7 can be fired to maintain the spacecraft's mission. Inherent inconsistencies with the thruster firings cause torque disturbances that create errors in spacecraft attitude that must be managed. The onboard computer 1 analyzes data relating to the actual attitude obtained from onboard sensors 8 and compares such data to the desired attitude which may be periodically updated by a ground station mission controls operator prior to the orbital corrective maneuver. The onboard computer 1 generates on time signals, energizing the thrusters 7 to correct for any difference between space craft attitude and the desired mission attitude. The thrusters are fired in response to a signal which is calculated to reduce the attitude error to within predetermined performance limits. Therefore attitude is continuously sensed, and analyzed, and error data is generated. The sensor data is analyzed by an onboard computer having multiple algorithms programmed therein to perform the necessary functions to generate thruster on time signals and fire the thrusters.

In the system of this invention, the onboard computer 1 includes a controller module 2, a thruster accounting module 3 and an observer module 4 as shown in FIG. 1. Ground station operator 5 supplies information relating to mission attitude and performance requirements to computer 1. Controller module 2 directly controls the firing of the thrusters 7 by generating appropriate digital on time signals. The accounting module 3 receives the digital on time signals provided by the controller module 2. Module 3 contains a table of individual thruster performance which it uses to estimate the attitude shifts that should occur from the thruster firing in response to the on time signal. The data, from which the estimates of accounting module 3 are derived, are based on rigid body models i.e. such data assumes that the spacecraft has no flexible appendages. Since accounting module 3 obtains these estimates based on rigid body models and ignores the flexible elements on the satellite, the reliance on sensor data corrupted by flexing disturbances is significantly reduced. In this manner attitude control can be accomplished without complicated compensation for flexible components.

Because of inherent inconsistencies in the forces generated by the thruster firing, the estimates of resultant attitude calculated by the accounting module 3 contain errors. In the system of this invention, attitude related data from the onboard sensors 8 are used to refine the estimates in observer module 4.

The observer module 4 of this invention is programmed with algorithms that generate data in digital form to assist the generation of digital on time signals by the controller module 2. Module 4 receives the estimated resultant attitude from the accounting module 3 and compares this data with data indicative of the actual attitude from sensors 8. The difference between the estimated resultant attitude and the sensed attitude is calculated and a first error signal is generated relative thereto. The estimated resultant attitude is then enhanced in accuracy by adjusting said estimated value in proportion to the first error signal. The adjusted estimates are incorporated in subsequent thruster firing cycles.

This adjustment or filtering process involves the comparison of the estimated resultant attitude data from accounting module 3 with the actual attitude obtained from the sensors 8. The estimated resultant attitude is then adjusted by a factor (the first error signal) proportional to the difference obtained from the comparison. In this manner the estimated resultant attitude is refined in subsequent firing cycles. In a similar manner, the estimates may be filtered with attitude data received from the earth sensor 9 (when available) to further improve these estimates.

In response to the enhanced estimated resultant attitude signal from observer module 4, controller module 2 calculates the error between the estimated/actual attitude indicated thereby compared to the required mission attitude, and generates an adjustment signal for the thrusters 7 in proportion thereto. This signal triggers thruster pulses to adjust the attitude. Since the on time signal is obtained substantially from rigid body assumptions enhanced with sensed attitude data from sensors 8, the signal generating process is independent of the receipt of the data from sensors 8. Therefore no additional triggering device such as a PWPF is needed.

Figure 2:
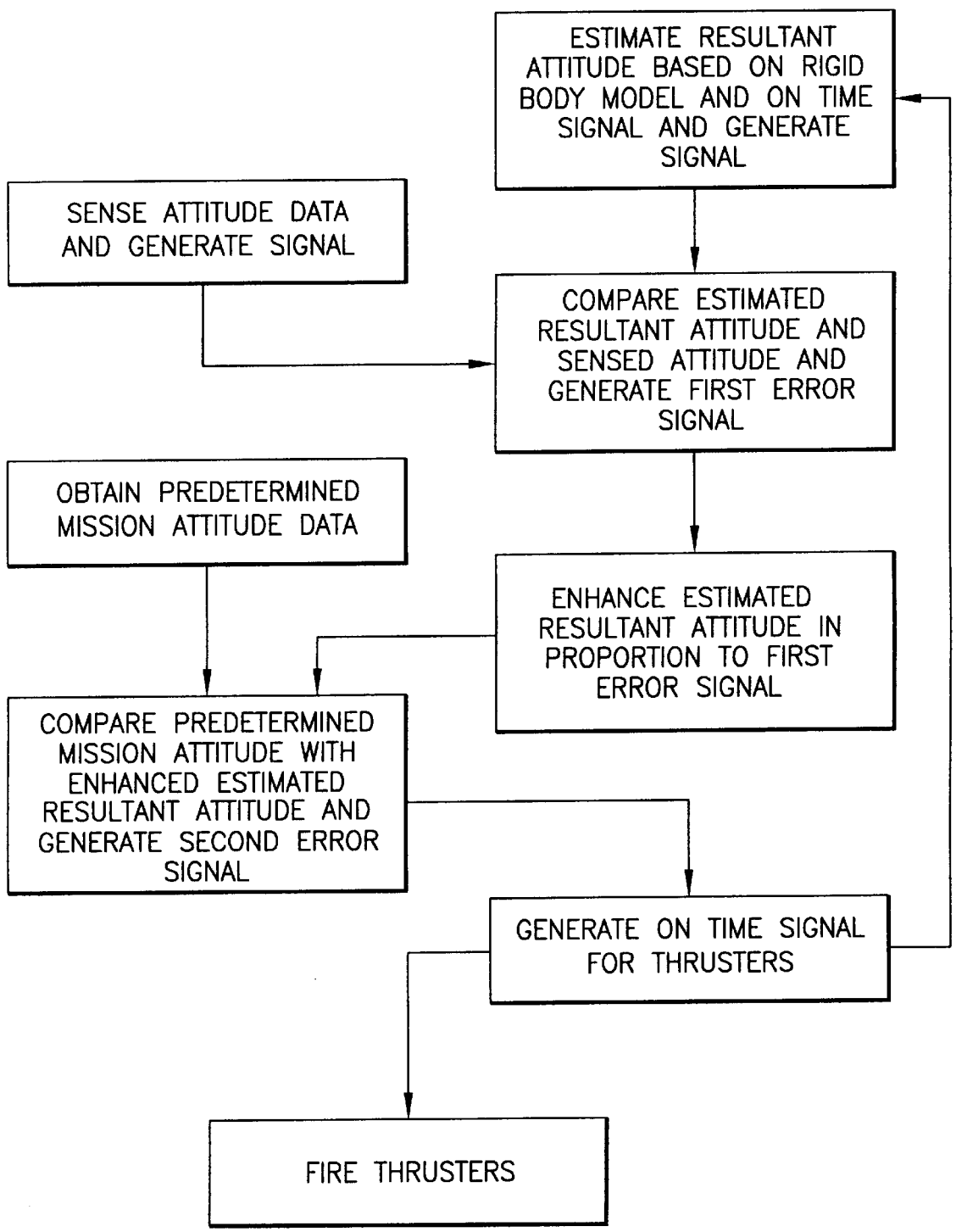
FIG. 2 is a flow diagram of the steps of the method of this invention.

In operation, as shown in FIG. 2, the basic method of this invention requires the establishment of a predetermined designated mission of the satellite to be determined and commanded by a ground station operator. The required data generally includes the desired attitude of the satellite, and the desired pointing accuracy requirements.

Initially the controller 2 generates an on time signal based on sensed data in order to begin the process of estimation. Based on the difference between the predetermined data and sensed attitude, an on time signal is generated to fire the thrusters. The on time signal is then processed by accounting module 3 and an estimated resultant attitude is determined using a rigid body model. This model assumes that there will be no oscillations due to flexible components. The model may be a simple look up table based on projected performance at specific thruster on times. This estimation step is derived from basic laws of Newtonian physics in which the thruster firings create torque, the torque shifts momentum, and momentum shifts attitude.

The actual attitude rate fluctuations are indicated by an on board gyroscopic sensor system 8 which senses rates indicative of momentum shifts. The resulting attitude signals are compared to the estimated momentum and a first error signal is calculated relative to the difference. The first error signal is used to adjust the estimated resultant attitude and momentum.

The enhancement of the accuracy of the estimated resultant attitude is needed because of the inherent inconsistency of the results of thruster firing. Although the adjustment to the estimated resultant attitude may be a simple addition of a factor proportional to the first error signal, i.e. the difference between estimated and sensed attitude, it must be accomplished with each component of the attitude equation for each axis of control.

In this manner the system and method of this invention provides a precise control of attitude without the complex consideration of the flexing component of disturbances, or the attitude oscillations caused thereby.

What is claimed is:

1. A system for controlling attitude in a space craft in orbit comprising:

a thruster configuration constructed to generate torque to adjust the attitude of the space craft to accommodate a predetermined mission;

an attitude sensor to sense the attitude related parameters of the space craft and generate a signal relative thereto;

means to obtain a predetermined attitude for the space craft mission;

an onboard computer adapted to generate first and second digital on time signals to fire the thruster configuration for a period of time to adjust the attitude of the space craft, said onboard computer further comprising:

an accounting module to estimate the adjusted attitude which would result from the thruster firing in response to said first digital on time signal and generate a signal relative to an estimated resultant attitude;

an observer module to compare the sensed attitude signal with the estimated resultant attitude and to generate a first error signal relative to the difference therein;

a processor to enhance the accuracy of said estimated resultant attitude in proportion to said first error signal, and to generate a signal relative to an enhanced estimated resultant attitude;

wherein said processor further compares the predetermined attitude with the enhanced estimated resultant attitude and to generate a second error signal relative thereto; and wherein said onboard computer generates a second thruster on time signal in response to said second error signal to adjust the attitude of the space craft.

2. A system for controlling the attitude of a space craft in orbit as described in claim 1 wherein the means to estimate resultant attitude includes means to obtain thruster performance data relative to the period of time of the thruster firing, said performance data based on rigid body assumptions, and means to compare the thruster on time signal generated by the onboard computer to said performance data and estimate the resultant attitude.

3. A method for controlling attitude in a space craft in orbit, said space craft including a thruster configuration constructed to generate forces to adjust the attitude of the space craft to accommodate a predetermined mission; comprising the steps of:

obtaining a desired attitude of the space craft required for the mission;

sensing the attitude related parameters of the space craft and generating a signal relative thereto;

generating a digital on time signal to fire the thruster configuration for a period of time to adjust the attitude of the space craft, said generation further comprising the steps of:

generating a first digital on time signal, based on said sensed attitude, for firing the thruster configuration;

estimating the adjusted attitude which would result from the thruster firing responsive to said first on time signal and generating an estimated resultant attitude signal relative thereto;

comparing the sensed attitude signal with the estimated resultant attitude signal and generating a first error signal relative to the difference therein;

processing the estimated resultant attitude signal to enhance the accuracy thereof in proportion to the first error signal and generating a signal relative to the enhanced estimated resultant attitude;

comparing the desired attitude with said enhanced estimated resultant attitude and generating a second error signal relative to the difference therein; and generating a second thruster on time signal in response to said second error signal, said signal calculated to adjust the attitude of the space craft.

4. A method for controlling the attitude of a space craft in orbit, said space craft including a thruster configuration constructed to generate forces to adjust the attitude of the space craft to accommodate a predetermined mission as described in claim 3 wherein the step of estimating the adjusted attitude resulting from the thruster firing comprises the steps of:

obtaining thruster performance data relative to the period of time of the thruster firing, said performance data based on rigid body assumptions;

comparing the thruster on time signal generated by the onboard computer to said performance data; and estimating the resultant attitude.

5. A method for controlling the attitude of a space craft in orbit, said space craft including a thruster configuration constructed to generate forces to adjust the attitude of the space craft to accommodate a predetermined mission as described in claim 3 wherein the step of sensing the attitude related parameters of the space craft includes the sensing of gyroscopic data.

6. A method for controlling the attitude of a space craft in orbit, said space craft including a thruster configuration constructed to generate forces to adjust the attitude of the space craft to accommodate a predetermined mission as described in claim 3 wherein the step of sensing the attitude related parameters of the space craft includes the sensing of earth position related data.

* * * * *